United States Patent [19]

Fischer et al.

[11] 4,141,947

[45] Feb. 27, 1979

[54] CONTINUOUS PROCESS FOR MAKING VARIEGATED SOAP

[75] Inventors: Charles F. Fischer, Jersey City; David P. Joshi, Piscataway, both of N.J.

[73] Assignee: Colgate-Palmolive Company, New York, N.Y.

[21] Appl. No.: 703,159

[22] Filed: Jul. 7, 1976

Related U.S. Application Data

[63] Continuation-in-part of Ser. No. 539,675, Jan. 9, 1975, abandoned.

[51] Int. Cl.[2] .............................................. B29F 3/12

[52] U.S. Cl. ...................................... 264/75; 252/367; 252/370; 252/371; 264/102; 264/148; 264/211; 264/320; 264/349

[58] Field of Search .................. 264/69, 70, 101, 102, 264/148, 176 R, 211, 349, 75, 320; 425/131.1, 199; 252/371

[56] References Cited

U.S. PATENT DOCUMENTS

| | | | |
|---|---|---|---|
| 2,005,333 | 6/1935 | Bodman | 252/371 |
| 2,649,417 | 8/1953 | Compa | 264/101 |
| 3,066,354 | 12/1962 | Chaffee et al. | 264/148 |
| 3,434,974 | 3/1969 | Austin et al. | 264/211 |
| 3,485,905 | 12/1969 | Compa et al. | 264/75 |
| 3,779,676 | 12/1973 | Bernard | 425/131.1 |
| 3,823,215 | 7/1974 | D'Arcangeli | 264/75 |
| 3,891,365 | 6/1975 | Fischer | 425/131.1 |

*Primary Examiner*—Jeffery R. Thurlow
*Attorney, Agent, or Firm*—Kenneth A. Koch; Herbert S. Sylvester; Murray M. Grill

[57] ABSTRACT

A high speed continuous process for making variegated soap bars is disclosed. Soap chips and an emulsion of minor soap ingredients are each continuously supplied to a mixer. The output of the mixer is a homogenized and variegated soap mass that is refined, plodded in a vacuum plodder, cut into soap bars and finally pressed.

5 Claims, 3 Drawing Figures

CONTINUOUS PROCESS FOR MAKING VARIEGATED SOAP

RELATED APPLICATIONS

This application is a continuation in part of co-pending application Ser. No. 539,675 filed Jan. 9, 1975 and now abandoned.

BACKGROUND OF THE INVENTION

1. Field of the Invention

The invention relates in general to a process for making variegated soap and more particularly to a high speed continuous process in which soap chips and an emulsion of minor soap ingredients including a coloring agent are continuously fed into a mixer.

2. Description of the Prior Art

Conventional processes for making soap include the use of an amalgamator mixer into which soap chips, perfume, bacteriostats, preservatives, opacifiers and other ingredients are introduced individually. The soap mass which exits from the amalgamator mixer is delivered to a mill where the soap mass is pressed and converted into ribbons which are then delivered to the input hopper of a soap plodder.

Among the disadvantages of conventional soap making process is the relatively slow rate of production of soap bars. Conventional soap making processes can produce soap bars at a rate of approximately 140 to 150 bars per minute.

Other disadvantages of conventional soap making processes is the requirement for the individual introduction of the various ingredients into the amalgamator mixer and the fact that the resulting soap bars at times show evidence of spotting or streaking of colors and specks on their surfaces. These defects in the end product result in a requirement for a high degree of relatively costly inspection to ensure the uniformity and quality of the product and the costly rejection and waste of inferior items.

Processes for producing variegated soap include the Compa et al U.S. Pat. No. 3,485,905 which discloses the addition of an aqueous solution of coloring material into the vacuum chamber of a double barred vacuum plodder. Other prior art processes include the addition of solid coloring material into the vacuum chamber typically in the form of a colored soap and the injection of coloring material into the soap mass in the final plodding apparatus.

The prior art also includes a process for reacting detergent ingredients with a neutralizing agent to form a detergent in an intensive zone. This process is described in the Austin et al U.S. Pat. No. 3,434,974.

SUMMARY OF THE INVENTION

The present invention overcomes the failures of the prior art to provide a high speed continuous process for making variegated soap which results in a product having uniformly high quality. In accordance with the present invention a continuous variegated soap making process is provided in which soap chips are continuously fed into a mixer unit and a pre-blended emulsion or slurry of minor soap ingredients including coloring material, bacteriostats, perfume, $TiO^2$, oil, and glycerine is continuously pumped into the same mixer unit. The output of the mixer unit is a soap mass that is homogenized except for the coloring material, which forms a pattern of strips arbitrarily arranged throughout the mass. The mixing unit is operated to thoroughly blend and disperse all of the minor ingredients except the coloring material throughout the soap mass. The variegated output of the mixer unit is delivered to the input hopper of a Mazzoni-type refining plodder for the step of refining and plodding. The refining step is optional depending on the type of final soap bar desired and the quality of the soap chips fed to the mixer unit. The output of the Mazzoni-type refining plodder is conveyed to the input of a vacuum plodder for the step of plodding and the resulting product is then cut into soap bars on a cutting table and pressed in a soap press in the conventional manner. If desired additional or different coloring material may be added to the soap mass in the vacuum plodder according to any of the known methods.

According to the invention a continuous process for making variegated soap bars is provided comprising the steps of: continuously feeding soap chips into a mixer unit that includes a screw mixer conveyor, continuously feeding a pre-blended emulsion of minor soap ingredients containing a coloring agent into said mixer unit continuously mixing the soap chips and the emulsion, the mixing step producing a variegated homogenized soap mass, continuously discharging the variegated soap mass from the mixer unit, supplying the variegated homogenous soap mass to a double barrel plodder, extruding the plodded soap mass and cutting said extruded mass into bar form.

The present invention makes possible a high rate of production of approximately 300 variegated bars per minute and eliminates the need for individual introduction of the various ingredients into a mixer unit. In addition, the present invention provides soap bars having optimum uniformity and a reduced incidence of specs on the surfaces of the soap bars.

It is an object of the present invention to provide a high speed continuous process for making variegated soap bars which results in a product of uniformly high quality.

Another object of the present invention is to provide a high speed continuous soap making process in which individual introduction of soap ingredients into a mixer is eliminated.

Another object of the present invention is to provide a high speed continuous soap making process which achieves a production rate of up to 300 bars per minute.

Another object of the present invention is to provide a high speed continuous soap making process in which the Beta phase of the soap product is increased.

Still another object of the present invention is to provide a high speed continuous soap making process in which labor and set-up time are reduced resulting in economy of production.

These, together with various ancillary objects of the present invention are obtained by this high speed continuous soap making process, a preferred embodiment being shown in the accompanying drawings by way of example only, wherein:

FIG. 1: is a flow diagram of a portion of a conventional soap making process:

FIG. 2 is a flow diagram of a portion of a high speed continuous soap making process according to the present invention; and FIG. 3 is a schematic view of an apparatus for the high speed continuous soap making process of FIG. 2.

DETAILED DESCRIPTION OF THE INVENTION

Figure 3:
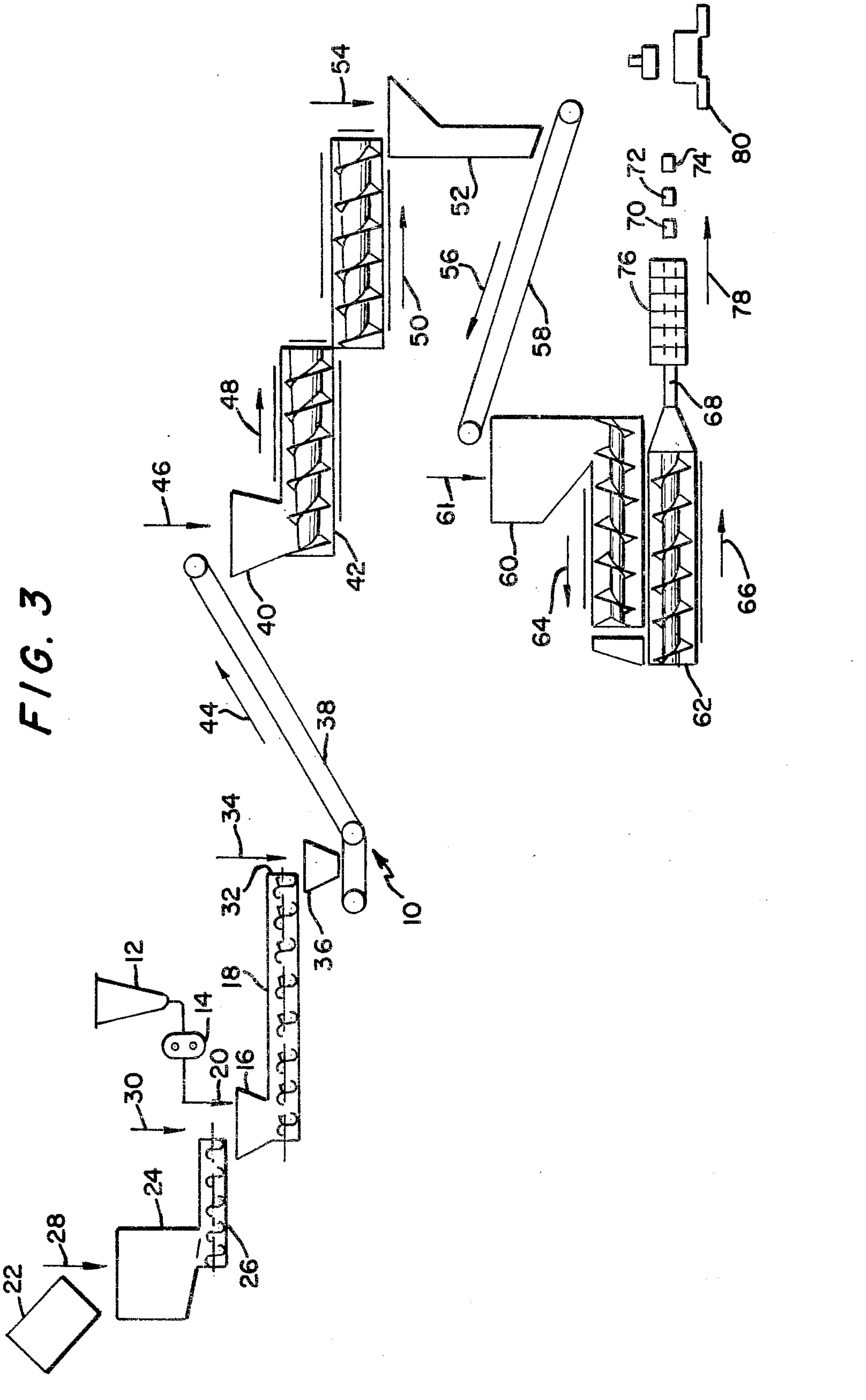

With continuing reference to the accompanying drawing, wherein like reference numerals designate similar parts throughout the various views FIG. 3 generally illustrates an apparatus for a high speed continuous soap making process according to the present invention. The apparatus of FIG. 3 includes a reservoir 12 which contains an emulsion of al minor soap ingredients such as coloring agents, bacteriostats, perfume, $TiO_2$, oil and glycerine. The emulsion is continuously fed by a pump metering system 14 to the input hopper 16 of a dog eared-type mixing screw conveyor 18. The direction of the flow of emulsion is shown by the arrow 20. A bulk charge of soap chips is fed from a tank 22 into the input hopper 24 of a vibra-screw metering feeder 26 in the direction shown by the arrow 28. The vibra-screw metering feeder 26 continuously meters and feeds the soap chips into the input hopper 16 of the mixing screw conveyor 18. The direction of the soap chips entering the input hopper 16 is shown by the arrow 30.

According to a specific aspect of the invention, the mixer screw conveyor 18 is operated to blend the minor ingredient's other than coloring agent throughout the bar. The mixing operation should be monitored to prevent the coloring agent from providing the soap mars with a uniform color. This can be accomplished by utilizing a non-aqueous coloring agent or a coloring agent that is insoluble in the soap mass. In any event high intensity, shear mixing should be avoided in the mixer screw coveyor 18.

The mixture of soap chips and emulsion exits from the end 32 of the mixing screw conveyor 18 as a homogenized variegated mass and falls, in the direction of the arrow 34, into the input hopper 36 of the upwardly inclined conveyor 38. The upwardly inclined conveyor 38 delivers the homogenized variegated mass to the input hopper 40 of a Mazzoni-type refining plodder 42 with the direction of flow first in the direction shown by the arrow 44 and then in the direction shown by the arrow 46. The direction of flow through the Mazzoni-type refining plodder 42 is shown by the arrows 48 and 50 and the output of the Mazzoni-type refining plodder 42 passes downward through the chute 52 in the direction shown by the arrow 54. The flow from the chute 52 is conveyed upward in the direction shown by the arrow 56 on an upwardly inclined conveyor 58. The flow then passes into the input hopper 60 of a vacuum plodder 62, in the direction shown by the arrow 61. The direction of flow through the vacuum plodder 62 is first in the direction shown by the arrow 64 and then in the direction shown by the arrow 66.

The screen that is normally present at the outlet of the upper barrel of the vacuum plodder is preferably removed in order to maintain a distinct variegated effect.

The output 68 of the vacuum plodder 62 is cut into individual soap bars, which are shown typically as soap bars 70, 72 and 74, on a cutting table 76. The soap bars are conveyed in the direction shown by the arrow 78 and are then pressed in a soap press 80.

In alternative embodiments of the apparatus, which are not shown, alternative pumping units may be substituted for the pump metering system 14 and alternative means for the feeding of soap chips into the input hopper 16, such as a conveyor system may be substituted for the tank 22 and the vibra-screw metering feeder 26.

In addition, a multiple screw mixer may be used in place of the single screw mixer 18.

Figures 1, 2:
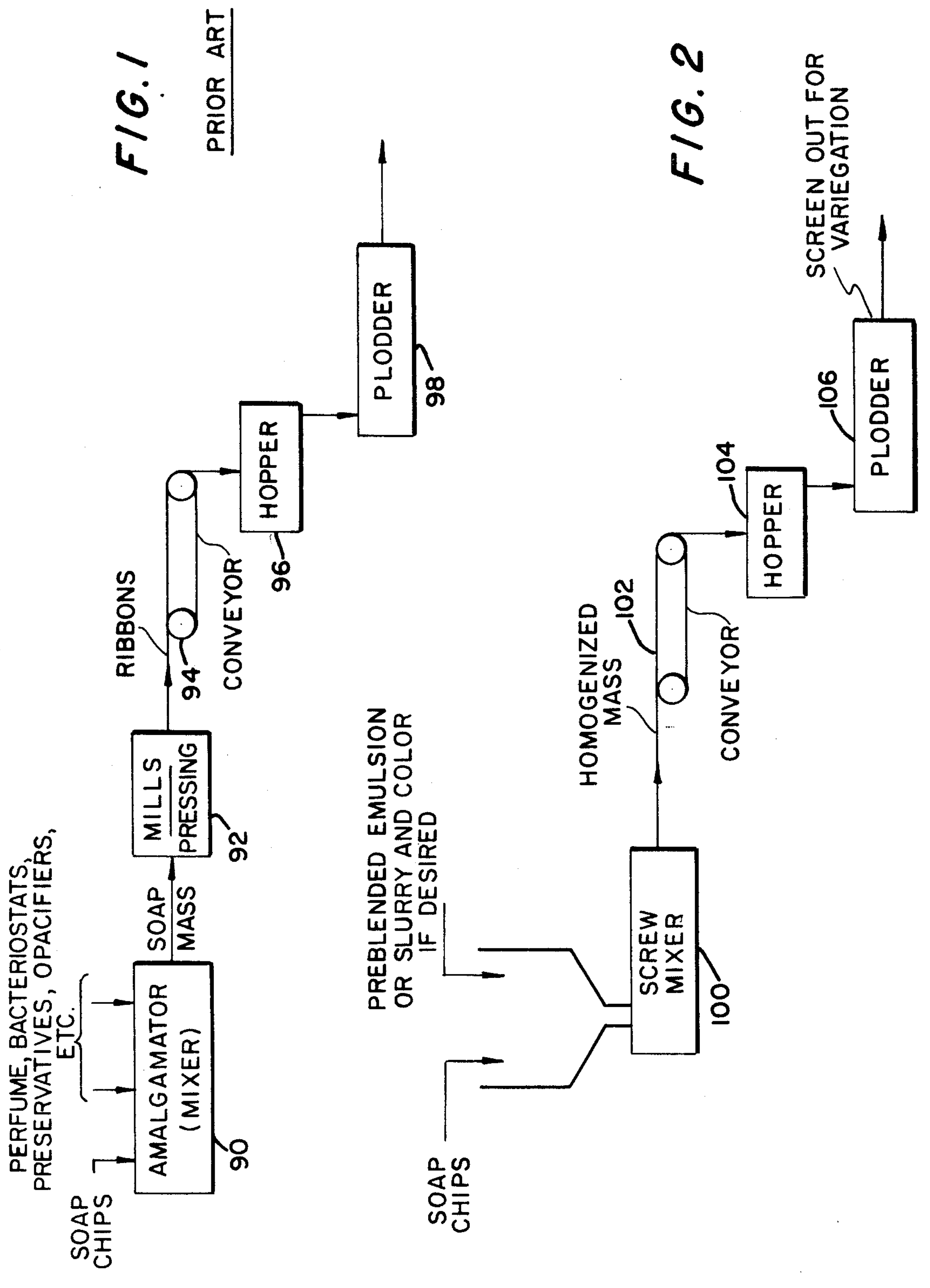
FIG. 1 PRIOR ART

A clear distinction between the high speed continuous soap making process according to the present invention and the prior art may be seen by a comparison of the flow diagrams of FIG. 1 and FIG. 2. The conventional soap making process is shown in part, in FIG. 1 and comprises individually introducing soap chips, perfume, bacteriostats, opacifiers etc. into an amalgamator (mixer) 90 and then transferring the soap mass produced by the amalgamater (mixer) 90 to mills 92 wherein the soap mass is pressed into ribbons. The ribbons of soap are then fed by a conveyor 94 to the input hopper 96 of a plodder 98. In contrast to the above, the process according to the present invention, shown in part in FIG. 2, comprises the step of introducing soap chips and a pre-blended emulsion or slurry of minor soap ingredients into a screw mixer 100. The output of the screw mixer 100 is a homogenized mass and is fed by a conveyor 102 to the input hopper 104 of a plodder 106. process according to the present invention are characterized by uniformly high quality, with increased Beta phase and a distinct striped effect.

A latitude of modification, substitution and change is intended in the foregoing disclosure, and in some instances, some features of the present invention may be employed without a corresponding use of other features.

We claim:

1. A continuous process for making soap bars comprising the steps of:

(a) continuously feeding soap chips into the input hopper of a mixer unit that includes a screw mixer conveyor
(b) continuously feeding a pre-blended emulsion of minor soap ingredients into said input hopper of said mixer unit
(c) said emulsion containing a coloring material
(d) continuously mixing said soap chips and said emulsion
(e) said mixing step blending said minor ingredients other than coloring agent throughout the bar and producing a variegated homogenized soap mass
(f) continuously discharging said variegated soap mass from said mixer unit
(g) supplying said variegated homogeneous mass to a double barrel vacuum plodder
(h) plodding said variegated soap mass in said double barrel plodder
(i) extruding said plodded variegated soap mass and
(j) cutting said extruded variegated soap mass into bar form.

2. A continuous soap making process according to claim 1 including the step of blending soap ingredients to form an emulsion before said step of charging said input hopper.

3. A continuous soap making process according to claim 1 wherein said emulsion includes bacteriostats, perfume, $TiO_2$, oil and glycerine.

4. The method according to claim 1 further including the step of pressing said bars to final shape.

5. The method according to claim 1 wherein said plodding step is performed in the absence of a screen after the first barrel of said double barrel plodder.

* * * * *